United States Patent Office 3,113,833
Patented Dec. 10, 1963

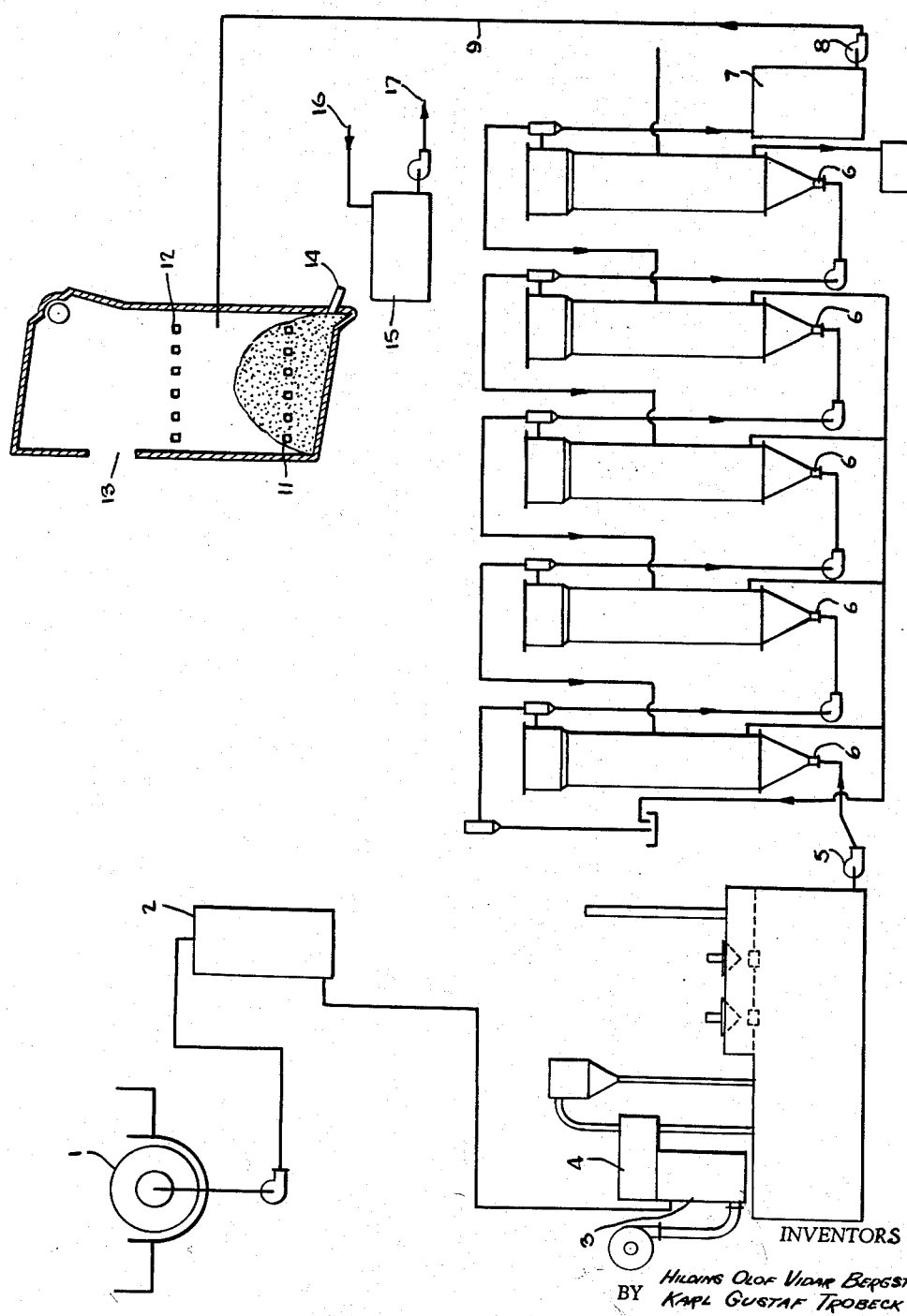

3,113,833
PROCESS FOR COMBUSTION OF WASTE LIQUORS
Hilding Olof Vidar Bergström, Kungsvagen 12, Stocksund, Sweden, and Karl Gustaf Trobeck, deceased, late of Roslags-Nasby, Sweden, by Åke Furrer, administrator, Tomtebogatan 5, Stockholm, Sweden
Filed June 15, 1960, Ser. No. 42,737
3 Claims. (Cl. 23—48)

This invention relates to the process for combustion and utilization of waste liquors obtained in the manufacture of so-called sulfate paper pulp, and is more particularly concerned with a process for recovering chemicals from such waste liquors.

The present invention constitutes an improvement upon the inventions described and claimed in prior Patents Nos. 2,406,581; 2,593,503; and 2,726,927.

The present application is a continuation-in-part of our prior application Serial No. 659,784, filed May 17, 1957, now abandoned, the latter application being itself a continuation-in-part of our application Serial No. 352,026, filed April 29, 1953, now abandoned.

In the aforementioned patents, 2,406,581 and 2,593,503, waste liquor is described as being concentrated until it carries 55% to 60% of solids, following which it is further dried, and the dried material then burned.

In the procedure described in Patent No. 2,593,503, the burning of the dry material recovered from the waste liquor is effected by surface combustion of the solid material after it reaches the floor of the combustion furnace.

According to our present invention, there is provided an improved method for recovering chemicals from black liquor from the sulfate process of making paper pulp.

We have found, in accordance with our present invention, that by burning partially oxidized black liquor under conditions in which the burning takes place in a reducing atmosphere, no objectionable amounts of sodium sulphide are formed, and other important advantages are secured, in contrast to the heretofore known processes of treating black liquor for the recovery of useful chemicals therefrom.

Briefly, the process according to the present invention comprises, essentially, the sequential steps of first substantially oxidizing the black liquor by exposing the same to air at elevated temperatures of about 170° F., but below its boiling point, concentrating the thus oxidized liquor to a solids content of about 50% to 60%, spraying this partially oxidized and concentrated black liquor into a combustion furnace so as to form porous solid particles which settle and accumulate therein as a heap or pile on top of the smelt at the bottom of the furnace, and feeding primary air into the furnace at points well beneath the top of the heap or pile so that the primary air, penetrating into the interior of the heap or pile and rising through the porous mass creates a reducing atmosphere for burning out the carbon content and residual sulfur content of the mass composing the heap. Whatever gases are formed are removed near the top of the furnace, and the molten substance or so-called "black stuff," containing the desired chemicals is removed near the bottom of the furnace. By thus effecting the burning of the mass in the furnace in a reducing atmosphere, no significant amounts of sodium sulphide or other objectionable sulfur-bearing compounds are emitted. Moreover, the walls of the furnace remain clean and undamaged from the effects of the combustion even after as much as six months' service.

The invention and the advantages thereof will be more readily apparent from the more detailed description below and from the accompanying drawing diagrammatically illustrating one procedure for carrying out the present invention.

In the drawing, numeral 1 designates a pulp washer from which the black liquor may be delivered to a tank 2.

From the tank 2, the liquor is delivered to a tower 3, whre it is subjected, preferably while it trickles over suitable devices within the tower, to oxidation with air at an elevated temperature of the order of 170° F., but below its boiling point. As depicted in the drawing, the liquor is admitted near the top of the oxidizing tower 3 and flows downward in contact with the upwardly moving air. Desirably, the oxidizing tower is provided at the top thereof with a foam box 4 to break up any foam that may form during the air oxidation of the liquor.

The liquor is thus substantially oxidized as it flows through the tower 3 and is discharged into a receiving tank from which it is conveyed, as by means of a pump 5, to a series of evaporators 6 of any conventional or suitable type, for concentrating the preliminarily oxidized liquor to a solids content to the order of 50 to 60%, by weight.

The thus oxidized and concentrated liquor is delivered to a reservoir tank 7. From tank 7 the material is conveyed, as by means of pump indicated at 8, through a feed pipe 9 to the combustion furnace 10.

As indicated in the drawing, the furnace 10 is provided with ports 11, shown as side ports, adjacent its sloping bottom wall, for delivering primary air into the furnace, beneath the surface of the liquid mass at the bottom of the furnace. If desired, the ports 11 may be located in the bottom wall of the furnace. Also, if desired, other air may be admitted to the furnace through upper ports 12. Gaseous products of combustion are drawn off through a flue 13, and the molten black stuff flows off through a discharge spout 14 into a receiving tank 15. The material in the tank 15 may be treated with water, admitted through a feedpipe 16, to dissolve the soda compounds and discharged through a pipe 17 to be causticized in the usual manner.

We have found that the preliminary oxidation of the crude black liquor as above set forth while it is in the thin liquor stage, serves to impart to it, in the subsequent concentrating step, such a composition and consistency that when it is then forcefully sprayed into the hot combustion furnace it is converted into porous solid particles which accumulate in a porous heap or pile which lies or floats on top of the soda smelt at the bottom of the furnace, and extends to the immediate proximity of the nozzles 11.

By thus accumulating the particles as a porous heap on top of the soda smelt at the bottom of the furnace, it becomes possible to provide for its combustion in a reducing atmosphere by feeding primary air into the furnace through ports 11 located at points well below the top of the heap. The combustion air thus introduced penetrates into the interior of the heap, and since the air is substantially completely surrounded on all sides by the material composing the heap, the oxygen content will not be sufficient for complete combustion within the interior of the heap. In other words, the air is introduced into the fuel rather than the fuel being introduced into the air as in ordinary combustion in furnaces, etc. Thus, the mass in the furnace is burned in a reducing atmosphere rather than in an oxidizing atmosphere. The reducing atmosphere created in the burning of the mass in the furnace in accordance with the present invention may be said to be analogous to the combustion of ordinary fuel oil in a reducing atmosphere by injecting hot air into a large volume of oil well beneath its surface, in contrast to the burning of the fuel oil in an oxidizing atmosphere by spraying it into air which vaporizes the oil drops in the air.

In the former instance, as will be understood, it would be impossible to produce an oxidizing atmosphere.

By burning the material in the furnace 10 by submerged combustion as described, not only is there no production of objectionable sodium sulphide, but a more efficient thermal system is provided. Moreover, there is no tendency to blockage of the primary air ports; the losses of black liquor material are smaller; the progress of combustion is more uniform; and the furnace chamber is easier to operate. Any objectionable materials in the gaseous products of combustion are so small as to be readily removed by conventional forms of collecting devices used in the recovery system, such as cyclones and sprays.

In actual practice of the process hereof, inspection of the submerged side air ports after six months of operation under the conditions of combustion herein described showed them still undamaged.

We claim:

1. In a method of recovering chemicals from black liquor from the sulfate process of pulp making, the steps comprising partially oxidizing the black liquor by exposing the black liquor to air at a temperature below the boiling point and at about 170° F., concentrating the thus treated liquor to about 50% to 60% solids, forcefully spraying the partially oxidized black liquor into a combustion furnace containing hot gases in a manner to cause the droplets of the sprayed liquor to fall directly toward the bottom of the furnace, become dehydrated and be deposited in the form of a porous heap of dry particles of the black liquor floating on the mass of molten soda smelt at the bottom of the furnace, burning said heap in a reducing atmosphere without forming objectionable amounts of sodium sulfide, said burning being effected by feeding primary air into said furnace at a point well beneath the top of said heap so as to penetrate into the interior of the heap and rise therethrough, withdrawing the gases from the furnace near the top of said furnace, withdrawing the molten substances at the bottom of said furnace, and treating the thus withdrawn molten substances to recover soda compounds therefrom.

2. In a method of recovering chemicals from black liquor from the sulfate process of pulp making, the steps comprising partially oxidizing the black liquor by exposure in a trickling stream to air at about 170° F., concentrating the thus treated liquor to about 50% to 60% solids, forcefully spraying the partially oxidized concentrated black liquor into a combustion furnace containing hot gases so as to cause the sprayed, oxidized and concentrated liquor to fall as droplets directly toward the bottom of the furnace, become dehydrated and be deposited so as to accumulate in the form of a porous heap which floats on top of the mass of molten soda smelt at the bottom of the furnace, burning said heap in a reducing atmosphere without forming objectionable amounts of sodium sulfide, said burning being effected by feeding primary air into said furnace at points well beneath the top of said heap so as to penetrate into the interior of the heap and rise therethrough, withdrawing the gases from the furnace near the top of the furnace, withdrawing the molten substances at the bottom of said furnace, and treating the thus withdrawn molten substances to recover soda compounds therefrom.

3. The method of recovering chemicals from black liquor from the sulfate process of making paper pulp, which comprises partially oxidizing the black liquor with heated air at temperatures below its boiling point and at about 170° F., said oxidizing step being sufficient to condition the liquor for conversion to the form of porous particles when concentrated and sprayed into a combustion furnace, concentrating the thus oxidized liquor to a solids content of about 50% to 60%, forcefully spraying the thus oxidized and concentrated liquor into a combustion furnace containing hot gases so as to cause the droplets of the thus concentrated, oxidized liquor to fall directly toward the bottom of said furnace, become dehydrated and be deposited so as to accumulate as a porous heap floating on top of the mass of molten soda smelt at the bottom of the furnace, feeding primary air into said furnace at a level substantially below the top of said heap so as to penetrate into the interior of the heap and rise therethrough, whereby to effect the burning of said heap in a reducing atmosphere without forming objectionable amounts of sodium sulfide, withdrawing the gases from the furnace near the top of said furnace, withdrawing the molten substances at the bottom of said furnace, and treating the thus withdrawn molten substances to recover soda compounds therefrom.

References Cited in the file of this patent

UNITED STATES PATENTS

| | | |
|---|---|---|
| 1,933,255 | Goodell | Oct. 31, 1933 |
| 2,495,248 | Gagliardi | Jan. 24, 1950 |
| 2,702,235 | Hochmuth | Feb. 15, 1955 |
| 2,726,927 | Bergstrom | Dec. 13, 1955 |
| 2,840,454 | Tomlinson | June 24, 1958 |

OTHER REFERENCES

Trobeck: "Paper Trade Journal," vol. 130, Apr. 20, 1950, pages 40–48.

Bauer et al.: "Canadian Journal of Technology," vol. 32, May 1954, pages 91–101.